United States Patent [19]

Kuhlmann et al.

[11] Patent Number: 5,060,742
[45] Date of Patent: Oct. 29, 1991

[54] WORK VEHICLE WITH TILTABLE CAB AND TILTING APPARATUS

[75] Inventors: Ludger Kuhlmann, Deidesheim; Dieter Friederich, Mannheim; Peter Ressel, Wallstadt, all of Fed. Rep. of Germany

[73] Assignee: Deere & Company, Moline, Ill.

[21] Appl. No.: 595,507

[22] Filed: Oct. 11, 1990

[30] Foreign Application Priority Data

Oct. 11, 1989 [DE] Fed. Rep. of Germany ....... 3933935

[51] Int. Cl.$^5$ .......................................... B62D 33/067
[52] U.S. Cl. ................................. 180/89.14; 180/89.16
[58] Field of Search ............... 180/89.13, 89.14, 89.15, 180/89.16

[56] References Cited

U.S. PATENT DOCUMENTS

| | | | |
|---|---|---|---|
| 3,618,692 | 11/1971 | Stikeleather | 180/89.14 |
| 3,851,913 | 12/1974 | Knoth | 296/35.1 |
| 4,061,392 | 12/1977 | Lowder et al. | 180/89.14 |
| 4,120,375 | 10/1978 | Shinoda et al. | 180/89.14 |
| 4,141,429 | 2/1979 | Hale | 180/89.14 |
| 4,253,700 | 3/1981 | Di Francescantonio | 180/89.14 |
| 4,269,282 | 5/1981 | Meacock, II et al. | 180/89.14 |
| 4,440,437 | 4/1984 | Hahm et al. | 180/89.13 |

FOREIGN PATENT DOCUMENTS

| | | |
|---|---|---|
| 0277097 | 8/1988 | European Pat. Off. . |
| 2504713 | 8/1976 | Fed. Rep. of Germany . |
| 2841575 | 4/1980 | Fed. Rep. of Germany . |
| 2530605 | 1/1984 | France . |
| WO 87/03259 | 6/1987 | World Int. Prop. O. . |

Primary Examiner—Kenneth R. Rice

[57] ABSTRACT

A work vehicle, in particular an agricultural or construction tractor, has a cab the lower portion of which lies partially between the vehicle's rear wheels and covers at least part of the power train. To provide adequate access for maintenance, repair, exchange and cleaning of the components beneath the cab without great difficulty and with little expenditure of time, the cab can, after removal of a rear wheel, be tilted laterally about a tilt axis approximately parallel to the longitudinal axis of the vehicle. The tilt angle is approximately 60° to 110°, and preferably about 90°. A readily transportable tilting apparatus also is provided which includes a hand-cranked spindle assembly for mounting to the chassis beneath the cab. This tiling apparatus is rigidly fastened to the chassis perpendicular to the longitudinal axis of the vehicle, and includes a lifting arm fastenable to the cab and projecting outward over the tilt axis and a connector pivotally connecting the free end of the projecting lifting arm to the spindle follower. Preferably, an upper-link of the three-point hitch typically found on this type of vehicle is used as the connector.

17 Claims, 3 Drawing Sheets

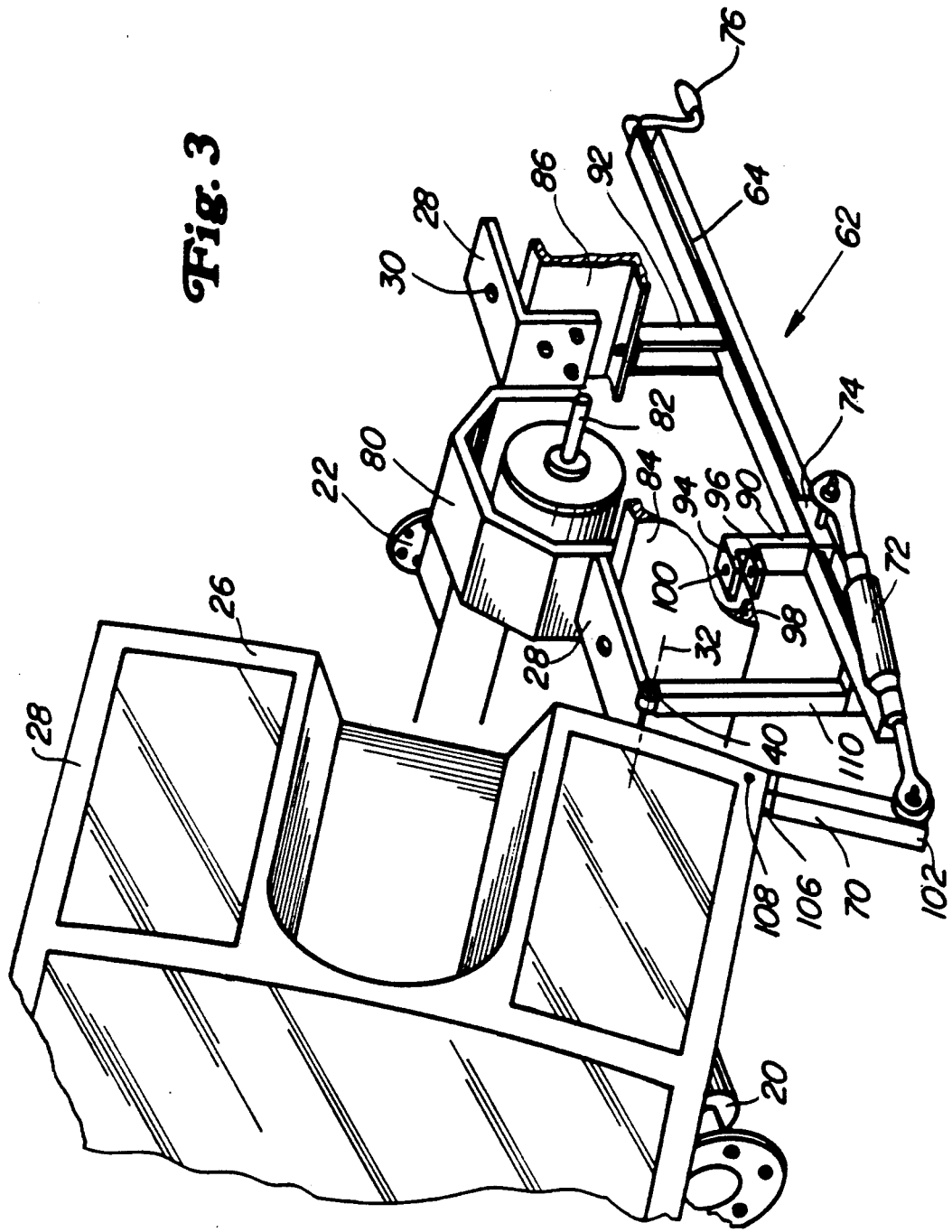

WORK VEHICLE WITH TILTABLE CAB AND TILTING APPARATUS

BACKGROUND OF THE INVENTION

1. Field of the Invention

The present invention relates to a work vehicle, in particular an agricultural or construction tractor, with a cab disposed in the area above the rear axle, whose lower portion lies partially between the rear wheels and covers at least part of the power train.

2. Description of the Related Art

It is of great importance to have good access to the power train components, the brake system and other mechanical, electrical and hydraulic mechanisms beneath the cab to perform maintenance, repairs and cleaning. Access from above is hampered by the cab. Access from the side can be obstructed by the parts of the frame or the like. Access from below is rather difficult and not adequate for much of the work to be done. It is also unsatisfactory if a crane has to be used to obtain access to the components.

In the case of tractors, access to the components beneath the cab traditionally has been gained by removing the cab from the chassis (as used herein, "chassis" should be understood to mean all of the vehicle except the cab). To do this, all connections between the cab and the chassis must first be undone. This includes all the screws fastening the cab to the chassis, as well as all electrical cables, Bowden cables, hydraulic lines and the like through which steering and other signals can be exchanged between the cab and the rest of the vehicle. Undoing these connections frequently requires special tools. Once the connections are undone, the cab must be lifted off of the chassis, for example, with a crane. Typically, a crane hook is hooked into an eye hook fastened to the cab roof frame to do this.

Removing and later replacing the cab is very time-consuming and can occupy two work days. Furthermore, this work is only possible where a crane is available. This is usually true only of relatively large shops with high ceilings.

One way of obtaining access without removing the cab entirely would be to tilt the cab. The broad principle of tilting the cab is known in the art. For example, the cabs in many trucks can be tilted to the front. However, tilting of the cab to the front is not possible, or possible only to a limited extent, on many work vehicles, such as, for example, agricultural or construction tractors with a cab mounted over the rear wheels.

A work vehicle with a laterally tiltable cab is known in the art from DE-OS 28 41 575. In this case, the cab is disposed over the engine in the area of the relatively small front wheels. The cab floor lies above the upper edge of the wheels, so that the wheels are not a hindrance during tilting. A lifting apparatus between part of the vehicle frame and the cab, for example, a scissor jack, is provided for tilting.

This laterally tiltable cab cannot be used with more conventional work vehicles where the cab is between the rear wheels, since the rear wheels would interfere with tilting of the cab and prevent sufficient lateral tilt to obtain access to the components under the cab. In addition, even in the prior art front mounted cab, the tilt angle is relatively small. This is justifiable there since tilting to both sides is possible and the tilting is intended for maintenance but not, for example, for the exchange of transmission units.

Tilting of the cab is treated in relatively nonspecific terms in DE-OS 28 41 575. For example, it is not mentioned how the connecting elements between the controls in the cab and units disposed on the chassis of the vehicle are to be dealt with.

SUMMARY OF THE INVENTION

The object of the present invention is to provide a work vehicle structure such that adequate access for maintenance, repairs, exchange and cleaning of the components beneath the cab, in particular parts of the power train, can be performed without great difficulty and with little expenditure of time. As few special tools as possible are to be required for this work.

This object is achieved according to the invention by tiltably mounting the cab about a tilt axis approximately parallel to the longitudinal axis of the vehicle. After removal of one of the rear wheels, the cab is laterally tiltable to the extent that comfortable access to the components beneath the cab is possible.

According to the invention, the cab can be tilted to a maximum angle between about 60° and 110°, preferably about 90°. In the case of a tractor, the maximum tilt angle is limited by the cab side wall striking the final drive assembly of the rear wheels, which should be avoided.

The tilt axis preferably runs approximately along one of the lower lateral edges of the cab. It is thus expediently defined by at least two hinges which each connect the chassis to the cab. The chassis is, for example, a primary vehicle frame which carries the drive components. If the primary frame is lacking, the hinges can be fastened to a secondary frame or, in the case of unitized construction of the drive, to a portion of the transmission housing.

In order to reduce transmission of noises and vibrations from the chassis to the cab, the cab supports normally contain damping elements which are located, for example, at the four corners of the cab floor. The position of these damping elements is also suitable for the introduction of hinges, in which case both elements can be jointly mounted.

To avoid interfering with the effect of the damping elements during operation, the hinges preferably each include a hinge pin which is only inserted for tilting the cab and which flexibly connects the two hinge leaves.

According to the invention, the mounting time when tilting the cab can be significantly reduced by flexibly and movably forming the communication lines connecting the cab controls to units on the chassis, so that tilting is possible without severing the communication lines. Thus, all connections relating to the vehicle-cab control system, such as the shifting mechanisms (e.g., Bowden cables), hydraulic systems (e.g., steering, brakes, control devices), ventilation, heating and air conditioning systems and the electrical system (e.g., a wiring harness) remain in place. This allows the vehicle to remain fully operational with the cab tilted, although it cannot be driven because of the one removed wheel. Thus the vehicle can be operated and tested even with the cab tilted.

It is advantageous to install the communication lines running between the cab and the chassis so that they approximately cross or run along the tilt axis. This will avoid excessively long loops of line for the hydraulic lines (tubes), the electrical lines (harness), the transmission components (cables) and the heating and air conditioning lines, which otherwise would have to be rolled up during tilting. When so disposed, the communication lines are only slightly moved and stressed during tilting.

Since a number of the controls, such as the brake pedals, the gear shift and the control lever for the hitch coupling and additional hydraulic components, are usually disposed on the right side of the cab, it is particularly advantageous for the tilt axis to run along the right side of the vehicle axis. This allows the communication lines between the cab and chassis to be relatively short and light.

To tilt the cab, the rear axle on the side of the tilt axis is first supported and then the wheel is removed. The hinge pins then are inserted into the hinge leaves and the cab fastenings in the area of the cab supports undone. Now the cab can be laterally tilted without severing the lines and the like. To tilt back to the starting position, the above steps are reversed.

Tilting the cab can be accomplished with the aid of a machine shop crane. For this, one can use an eye-hook, anchored in the cab roof frame, into which a crane hook can be hooked.

However, it is preferable for the cab to be tiltable without a crane (for example, to carry out repairs or maintenance outside of a shop), so a mechanical tilting apparatus mountable on the chassis preferably is provided.

According to this aspect of the invention, the tilting apparatus provides a spindle assembly beneath the cab rigidly fastened to the chassis perpendicular to the longitudinal axis of the vehicle, with an outwardly projecting lifting arm fastened to the cab and a connector which pivotally connects the projecting end of the lifting arm to the spindle follower. The tilting apparatus preferably is be fastened at the front end of the cab at the level of the front tilting hinge. This insures a stable point of application for the transmission of tilting forces.

The tilting assembly can be relatively small and light, so that it can be carried comfortably in a mobile tool cart. It is particularly advantageous for the tilt apparatus to use components belonging to the standard operating equipment of the vehicle. Thus, the upper linkage of a vehicle with a three-point hitch can expediently serve as connector. Since the upper linkage is formed to be adjustable lengthwise, it serves well as an adjust length connector.

The part of the tilt apparatus fastened to the cab and projecting over the tilt axis serves as the lifting arm for tilting. It preferably is a strut projecting approximately horizontally outward from the cab. Preferably, this part has a square hollow profile which can be urged into the lower transverse shaft of the cab frame, which also usually has a square hollow profile. The strut can further include a stop or reinforcement which limits the insertion length. A strut of this type can be mounted quickly and is secure during operation. It preferably can be secured against working out by a bolt which can be inserted into a hole in the frame and a corresponding hole in the strut.

The handling of the tilting apparatus is simplified if it includes a stop which limits the tilting. For this purpose, it is expedient to choose the position and length of the spindle housing and the projecting lifting arm so that the arm strikes the spindle housing on reaching the maximum allowable tilt angle.

The spindle assembly preferably contains a U-shaped housing which carries two supports for fastening to the chassis, for example, to the primary or secondary frame or to a suitable support fastened to the transmission housing. One support can include a U-shaped guide on its free end which can surround a flange projecting horizontally from the chassis. Fastening this support to the chassis is accomplished by a connecting bolt which can be inserted into mutually corresponding holes in the guide and the flange. A second support consists of a U-shaped rail welded to the spindle housing whose free end can be screwed to the chassis.

This design permits comfortable mounting in which the U-shaped guide is initially urged onto the projecting flange, whereby the spindle assembly is temporarily held just by the flange. The second support then is screwed tight onto the chassis and finally the first support is firmly affixed to the chassis by insertion of the bolt into the holes in the first supports, as well as the flange, and, if necessary, by screwing the bolt tight. The support can be relatively short, so that the tilting apparatus is relatively small and compact and has a high degree of inherent stability.

A further increase in stability of the assembly preferably is obtained by having the spindle assembly carry an upward pointing supporting strut, whose upper free end can be fastened to the hinge or to the cab frame in the vicinity of the hinge. The length of the supporting strut can be adjusted to match tolerances and settings.

To fasten the supporting strut to the cab frame, the upper end of the supporting strut expediently includes a perpendicularly directed thread into which can be screwed a bolt which is supported on the cab frame. A transverse screw can be used to hold the bolt between the supporting strut and cab frame.

In order to be able to operate the tilting apparatus from a safe place where sufficient space is also available, the spindle assembly has a hand crank on the side of the vehicle opposite the tilt axis. The end of the spindle assembly provided with the hand crank projects over the chassis on this side, so that there is good observability of the tilting process from the point of operation.

This tilting apparatus allows the cab to be guided to and held securely at any stage of the tilting process, so that the tilting process can be interrupted at any time without endangering people or property.

BRIEF DESCRIPTION OF THE DRAWINGS

The invention will be described and illustrated in greater detail with the aid of the following drawings showing exemplary embodiments of the invention:

FIG. 3 is a left three-quarter perspective partial view of the back portion of a tractor with its cab tilted and with an alternative embodiment of the tilting apparatus attached.

DETAILED DESCRIPTION OF THE PREFERRED EMBODIMENTS

Figure 1:
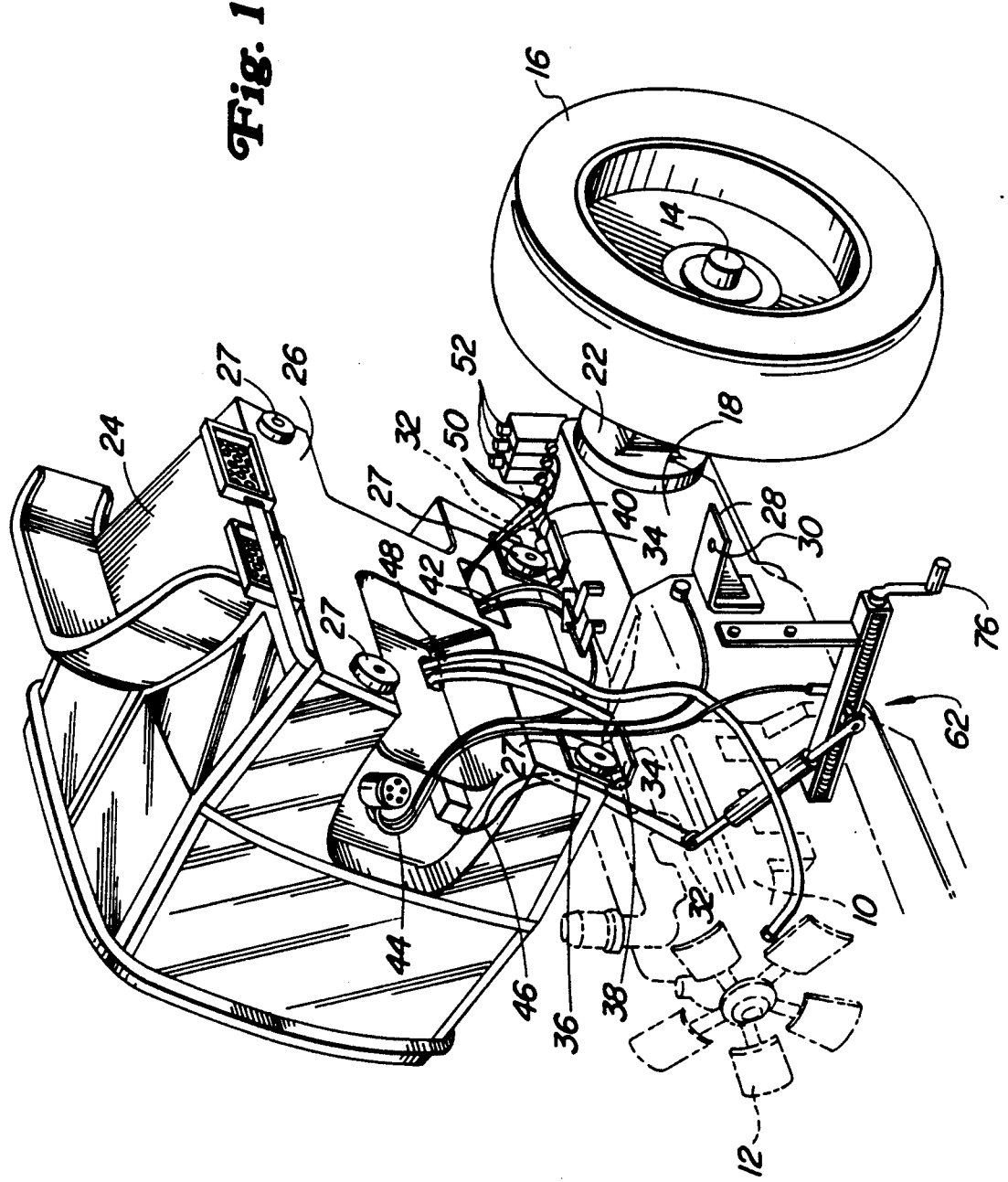
FIG 1 is a right three-quarter perspective view of the back portion of a tractor with its cab laterally tilted and with the tilting apparatus attached.

The rear portion of a tractor can be seen in FIG. 1. The engine 10 along with its cooling fan 12 are indicated by dotted lines. Attached to the engine 10, is the power train of the tractor which typically comprises a clutch, a shift-range transmission, a rear differential, the rear axle 14 and the rear wheels 16. The right rear wheel has been removed. The power train is located in one or more transmission housings 18 as well as both rear final drive assemblies 20, 22. (Final drive assembly 20 is visible in FIGS. 2 and 3.)

The cab 24 ordinarily is disposed above the power train and between the two rear wheels 16. Consequently, in the normal operating position of the cab, the cab floor 26 is below the upper edge of the rear wheels 16. The cab 24 rests on four cab supports 27 which are fastened to the four corners of the cab floor 26 and contain damping elements. In the normal operating position of the cab 24, the cab supports 27 lie on supports 28 fastened to the transmission housing 18. Holes 30 are provided in the supports 28 through which fastening bolts can be inserted for holding on the cab 24. In the drawing, the cab is not shown in its normal operating position, but rather tilted into the repair/maintenance position provided according to the present invention. A tilt axis 32 runs along the right side of the vehicle approximately parallel to the longitudinal axis of the vehicle. The tilt axis 32 is formed by two hinges 34.

Figure 2:
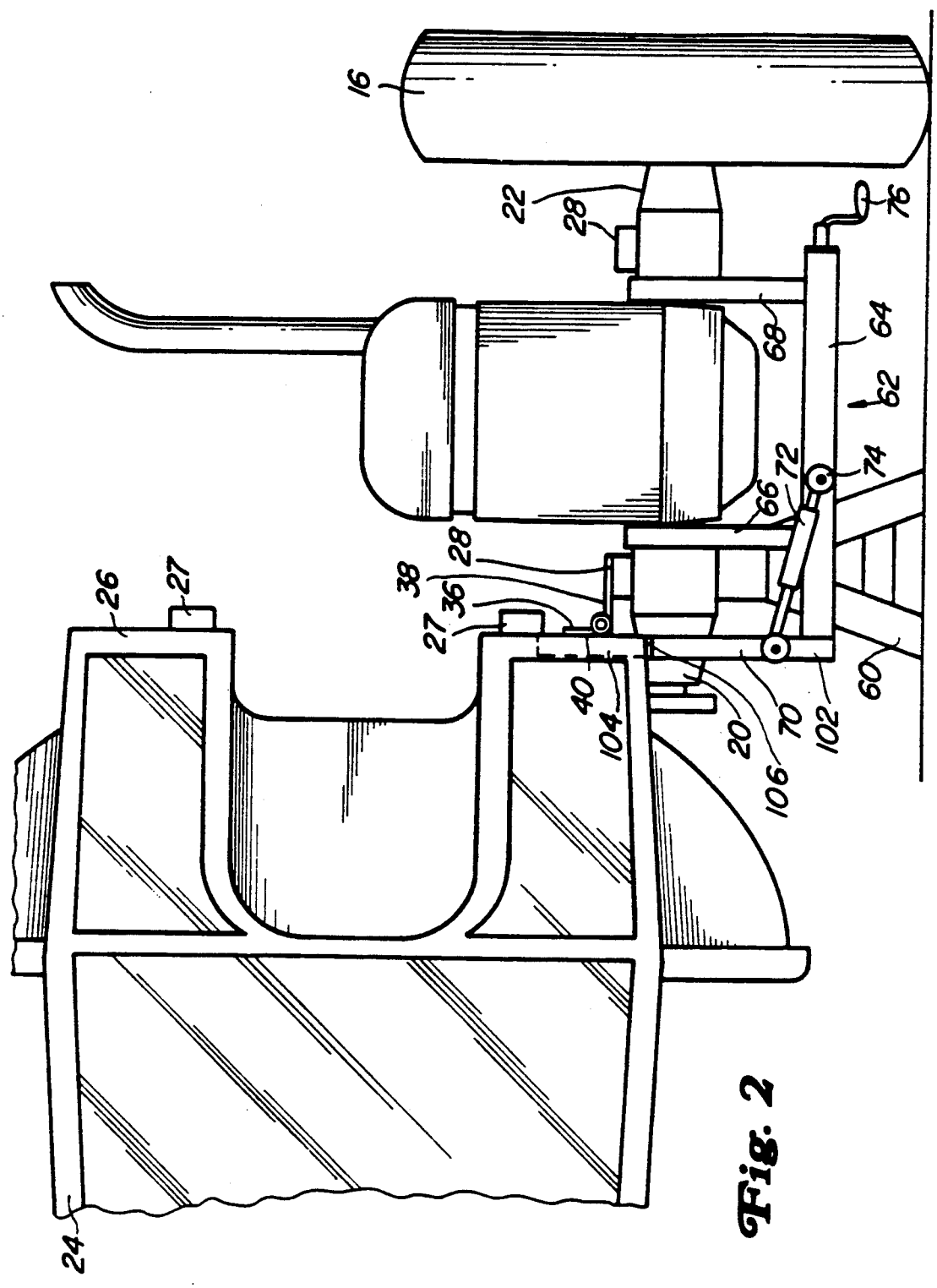
FIG. 2 is a front view of a tractor with its cab laterally tilted and with the tilting apparatus attached.

As best seen in FIG. 2, each of the hinges 34 comprises two leaves 36, 38 and one hinge pin 40. Each of the leaves 36 is fastened to the cab floor 26 and each of the leaves 38 is fastened to the corresponding support 28. In order not to detract from the damping effect of the cab supports 27, the hinge pin 40 is inserted into the corresponding opening of the leaves 36, 38 only when pivoting of the cab 24 is intended.

In the preferred embodiment, the display(s) and controls in the cab 24 are connected to the rest of the vehicle only by completely premountable flexible communication lines connecting to the corresponding units on the chassis. These flexible lines are shown in the FIG. 1 as cables 42 between the gear shift in the cab 24 and the various transmission components; hydraulic lines 44, 46, for the power steering and power brake systems; the air-conditioning and heating lines 48; the control lines 50 for actuation of supplementary control devices 52, as for example, hydraulic couplers; and the electrical lines connected to the harness, which have not been shown in detail, but which serve to communicate electric signals between the cab 24 and the chassis. All the aforementioned communication lines are so installed that they approximately cross or partially run along the tilt axis 32, so that the communication lines are merely slightly bent or turned during tilting. This results in no or only slight stresses being exerted on the communication lines upon tilting of the cab 24. Preferably, to keep the communication lines short, the corresponding control apparatuses are disposed on the right side of the cab 24.

In FIG. 2, the right wheel of the tractor has been removed after a wood block 60 was placed beneath the right final drive assembly 20 to support the tractor. The cab 24 is tilted to its repair/maintenance position, which is approximately 90° from its operating position.

A tilting apparatus 62 is mounted beneath the cab. This includes a spindle assembly 64, which is fastened to the chassis (for example, to the transmission housing) by two brackets 66, 68; a lifting arm 70 projecting out from the cab side wall; and a connector 72. The connector 72 is pivotally attached at one end to the lifting arm 70, which projects past the side of the cab. At the other end, the connector 72 is pivotally attached to the spindle follower 74 of the spindle assembly 64.

The spindle assembly 64 projects beyond the chassis on the side of the tractor opposite the tilt axis 32 and has a hand crank 76 there. The tilting process is readily observable from the position of the hand crank 76, without the technician being present in the area of tilting and thus being put in danger.

The most preferred embodiment of the tilting apparatus is shown in FIG. 3, in which most parts of the tractor have been omitted for clarity. (Only cab 24, the transmission housing 80 and the final drive assemblies 20, 22 are visible. The transmission input shaft 82, through which the transmission connects with the engine, projects from the transmission housing 80.)

Components of this embodiment of the tilting apparatus which are identical to the prior embodiment have been labeled with the same reference numerals. The transmission housing 80 lies between two secondary frame parts 84, 86. The front supports 28 are fastened to these. Similar rear supports can, for example, be fastened to the final drive assemblies 20, 22 or to some other rear housing part of the tractor.

The tilting apparatus is mounted perpendicularly to the longitudinal axis of the tractor beneath the frame parts 84, 86. The spindle assembly 64 is formed as a U-shaped housing which surrounds the spindle. Two supports 90, 92 are mounted to the spindle housing, for example, by welding. The first support 90 includes at its free, upwardly pointing end two horizontal parallel brackets 94, 96 which together form a U-shaped guide engageable with a horizontally directed flange 98 of the secondary frame part 84. A connecting bolt (not shown) can be inserted into the corresponding holes 100 to fasten the first support 90 to the secondary frame part 84. The second support 92 is formed by a U-shaped rail whose upper free end can be screwed to the secondary frame part 86.

In mounting the spindle assembly 64 under the secondary frame part 84, the U-shaped guide 94, 96 of the first support 90 is urged over the flange 98. The second support 92 then is screwed to the secondary frame part 86. Finally the spindle assembly 64 is so directed that it lies perpendicular to the longitudinal axis of the vehicle whereupon the connecting bolt (not shown) can be inserted through and, if necessary, screwed into the holes 100.

The spindle assembly 64 carries a hand crank 76 at one end. The other end of the spindle assembly 64 is long enough that it serves as a stop for the lifting arm 70 fastened to the cab side wall. If the cab 24 is tilted far enough about the tilt axis 32 by turning the hand crank 76 (thus urging the spindle follower 74 further than is represented in FIG. 3), the free end 102 of the lifting arm 70 will strike the face of the spindle assembly 64 opposite the hand crank 76 (as shown in FIG. 2), limiting the tilt angle to about 90°. As will be apparent, the precise value of the maximum angle will depend upon the length of the free end 102.

The upper linkage of the three-point hitch usually found on a tractor can conveniently be used as the connector 72. The length of a conventional upper linkage is adjustable, and so can be adjusted to fit the tilting assembly. Using the upper link in this fashion has the advantage that it minimizes the number of parts which must be carried to the tractor to tilt the cab.

As best seen in FIG. 2, lifting arm 70 preferably is a square tube which can be inserted into a corresponding recess 104 in the lower cab frame. The lifting arm 70 includes a collar 106 for limiting the amount of insertion into the recess 104. Furthermore, a hole 108 (see FIG. 3) is provided in both lifting arm 70 and the cab frame through which a bolt can be inserted, thus preventing lifting arm 70 from falling out of the cab frame.

Preferably, an upward-pointing support strut 110 also is fastened laterally to the U-shaped spindle housing 64. The upper end of the supporting strut 110 is pivotally connected to the cab frame in the vicinity of the front right hinge 34, or to the hinge itself. The length of the supporting strut 110 is adjustable by means of a threadedly adjustable bracket at its upper end, through which a bolt which can be screwed into the cab frame. Tolerances and settings can be matched by adjusting the supporting strut length.

The use of a supporting strut 110 is not required in principle. Nevertheless, it increases the stability of the tilting apparatus 62 so that the usual structural parts have to withstand smaller forces and can appropriately be formed of less rugged components.

In the most preferred embodiment, the tilt apparatus 62 preferably is fastened at approximately the same longitudinal position along the tractor as the front tilt hinge 34. This helps ensure stable cab support.

OPERATION

Tilting of the cab 24 using the titling apparatus just described is conducted as follows:

The lifting arm 70 is inserted into the corresponding opening 104 in the cab frame and secured by a bolt through holes 108. The spindle assembly 64 is fastened to the secondary frame parts 84 and 86 in the manner already described. The upper end of the supporting strut 110, if provided, is fastened to the cab frame in the vicinity of hinge 34. The effective length of the supporting strut 110 can be adjusted as required. The connector 72 then is connected between the free end 102 of the lifting arm 70 and the spindle follower 74, e.g., with bolts or pins.

After the tilting apparatus 62 is mounted on the vehicle, the back right side of the vehicle is lifted slightly and supported by a wood block 60. The right rear wheel then can be removed. Subsequently, the hinge pins 40 are inserted into the hinges 34 and the screws holding the cab 24 onto the chassis are undone.

Tilting of the cab 24 then can be accomplished by turning the hand crank 76. All further connections between chassis and cab 24 (electrical and hydraulic lines, as well as cables) are flexible and allow tilting. When turning the hand crank 76, the spindle follower 64 moves to the left side of the vehicle. Thus the connector 72 pulls the projecting lifting arm 70 downward and pivots this along with the cab 24 about the tilt axis 32. The tilting can continue until the free end 102 of the projecting lifting arm 70 strikes the right face of the spindle assembly 64 and limits further movement.

Tilting back to the starting position and resetting the cab on the tractor chassis is accomplished by reversing the steps above.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A work vehicle comprising:
   a. a vehicle chassis including a rear axle having rear wheels at each end thereof;
   b. a power train disposed at least partially between said rear wheels;
   c. a cab tiltably mounted to said vehicle chassis to tilt about a tilt axis approximately parallel to the longitudinal axis of said vehicle chassis and tiltable between a normal operating position with said cab disposed over the rear axle, with the lower portion of said cab at least partially between said rear wheels and covering at least part of said power train, and a repair/maintenance position allowing comfortable access to the components which would be beneath said cab in its operating position, said cab being tiltable to its repair/maintenance position after removal of one of said rear wheels.

2. The work vehicle according to claim 1, wherein the maximum tilt angle between the operating position of the cab and its repair/maintenance position is between 60° and 110°.

3. The work vehicle according to claim 2, wherein said maximum tilt angle is about 90°.

4. The work vehicle according to claim 1, wherein the tilt axis runs approximately along a lower lateral edge of the cab.

5. The work vehicle according to claim 1, wherein the cab is mounted to the chassis by at least two hinges.

6. The work vehicle according to claim 5, wherein the work vehicle further is provided with damping means between the cab and the chassis for damping vibration, and where the hinges are adjacent to the damping means.

7. The work vehicle according to claim 5, wherein each of said hinges includes a hinge pin which can be removed when the cab is in its operating position.

8. The work vehicle of claim 1, wherein flexible display and control communication means are provided to connect the displays and controls in the cab to the chassis flexibly, so that the cab can be tilted without disconnecting said flexible display and control means.

9. The work vehicle of claim 8, wherein the flexible communication means run approximately over the tilt axis.

10. The work vehicle of claim 8, wherein said flexible communication means are selected from the group consisting of hydraulic lines, Bowden cables and electrical lines.

11. A tilting apparatus for tilting the cab of claim 1, comprising:
    a. a spindle assembly having a spindle and a spindle follower, the spindle assembly being rigidly fastenable to the chassis beneath the cab in a position substantially perpendicular to the longitudinal axis of the vehicle chassis;
    b. a lifting arm fastenable at one end to the cab; and
    c. a connector pivotally connected at one end to said spindle follower and at the other end to said lifting arm.

12. The tilting apparatus of claim 11, wherein the vehicle includes a three-point hitch, and the upper linkage of the three-point hitch serves as said connector.

13. The tilting apparatus of claim 11, wherein the cab has a profiled opening formed in its frame and wherein said lifting arm has a similarly shaped profile and is insertable in said opening.

14. The tilting apparatus of claim 11, wherein the positions and lengths of the spindle assembly and lifting arm are such that the lifting arm will strike the spindle assembly and be prevented from moving any further when a predetermined maximum tilt angle for the cab is reached.

15. The tilting apparatus of claim 11, wherein said spindle assembly is provided with at least two brackets for mounting the spindle assembly to the chassis, one of said brackets including guide means for at least temporarily supporting one end of said spindle assembly during installation of said spindle assembly.

16. The tilting assembly of claim 15, further comprising a third bracket for mounting the spindle assembly to the chassis, said third bracket having an adjustable length.

17. The tilting assembly of claim 11, wherein said spindle assembly further comprises a hand crank for turning said spindle, said hand crank being positioned on the side of said chassis opposite the tilt axis of the cab.

* * * * *